3,021,113
AUTOMOTIVE CABLE WINCH
Court J. Kinnison, Oakland, Calif., assignor to Western Piping & Engineering Co. Inc., a corporation
Filed Jan. 11, 1960, Ser. No. 1,461
2 Claims. (Cl. 254—165)

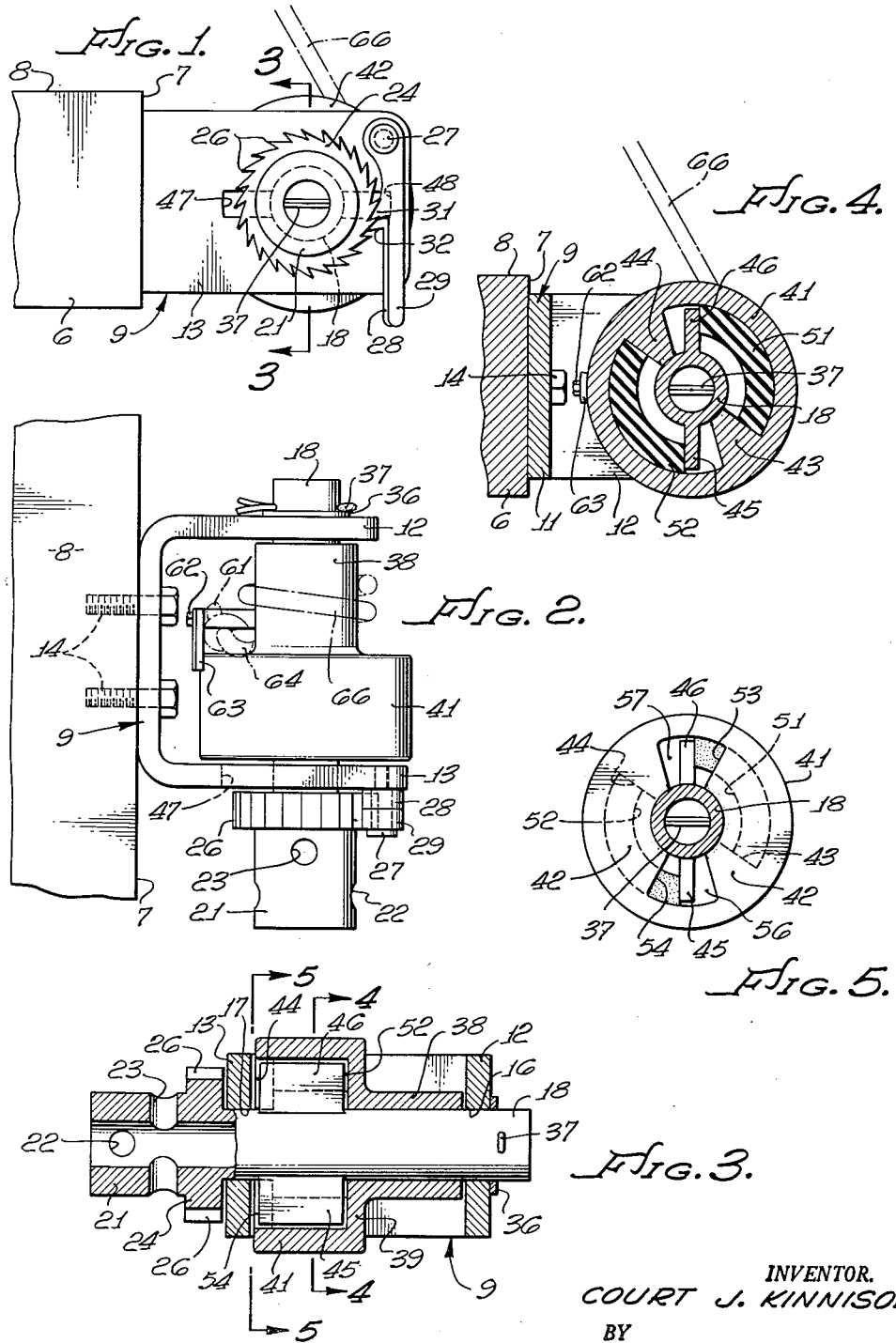

My invention relates primarily to relatively small winches now utilized on automotive vehicles such as trucks, trailers and railroad flatcars for use in tightening cables extended over the lading on the vehicle for the purpose of holding the lading in position. While it is relatively simple to put sufficient tension in the cable to hold the lading well anchored, there are certain excessive strains which arise during the movement of the vehicle which tend to make it difficult to prevent parts of the lashing or holding structure from failing or which make it difficult to fasten the cable with precisely the right strain upon it.

A mechanism for accomplishing at least some of this operation is shown in Patent 2,895,714 issued to Clark on July 21, 1959. According to the Clark patent, there is included in the winch mechanism a rubber buffer or snubber which assists in absorbing excessive shock. This is a valuable attribute but carries with it certain difficulties.

It is therefore an object of my invention to provide an automotive cable winch which has a rubber element in the force transmitting and receiving members but which is free of the difficulties heretofore attendant upon such an arrangement.

Another object of the invention is to provide an automotive winch mechanism in which the structure is such as to permit a very close control over the amount of initial tension put into the cable.

Another object of the invention is to provide an automotive winch mechanism in which the bearing mechanism for carrying the cable load is considerably improved.

Another object of the invention is to provide a mechanism in which the number of parts and their manufacturing difficulty are both reduced.

A still further object of the invention is to provide an automotive cable winch which can readily and easily be assembled and in which the loss of parts due to vibration or carrying away is substantially reduced.

A still further object of the invention is, in general, to provide an improved automotive cable winch.

These objects, together with others, are attained in the embodiment of the invention described in the accompanying description and illustrated in the accompanying drawing in which:

FIGURE 1 is a side elevation of an automotive cable winch made pursuant to the invention and shown as seen from the pawl end;

FIGURE 2 is a plan of the structure shown in FIGURE 1;

FIGURE 3 is a longitudinal cross-section, the plane of which is indicated by the line 3—3 of FIGURE 1;

FIGURE 4 is a cross-section, the plane of which is indicated by the line 4—4 of FIGURE 3; and FIGURE 5 is a cross-section, the plane of which is indicated by the line 5—5 of FIGURE 3, certain portions of the structure being omitted for clarity.

While the automotive cable winch pursuant to the invention can be incorporated in a widely variant number of ways, depending upon particular service conditions and the nature of the installation or environment, it has successfully been incorporated in practice, as shown, in a form for use primarily on an automotive trailer, for example. In this installation, the trailer includes a bed 6 having an upright side surface 7 and an upper surface 8 on which the lading is normally disposed. To the side surface 7 there may be attached automotive winches, one of which is illustrated herein. The winch includes a frame 9 conveniently fabricated of strap iron bent into a U-shape to provide a central attaching portion 11 and a pair of arms 12 and 13 of unequal length. Suitable fastening devices 14 pass through the central portion 11 of the frame 9 and firmly engage the bed 6 of the trailer so that the frame arms 12 and 13 extend horizontally outwardly from the trailer bed, although other positions are often used.

The frame arms 12 and 13 are both provided with journal openings 16 and 17 generally circular in contour to receive a driving tube 18 having a bearing fit therein. The driving tube 18 is preferably circular cylindrical in cross-section for most of its length or for at least a distance sufficient to pass through and bear in the arms 12 and 13 of the frame. The driving tube on one projecting end is provided with an enlarged boss 21 having a pair of cross-bores 22 and 23 to receive a rotating rod (not shown) in the customary way so that the driving tube 18 can be rotated within the frame.

Also formed integrally with the driving tube is a ratchet 24 usually of a somewhat greater diameter than the extending boss 21 but slightly less in diameter than the height of the adjacent arm 13 of the frame. The teeth 26 of the ratchet are arranged around the periphery of the ratchet in the customary way at a predetermined, relatively fine pitch, and are protected by the adjacent arm 13.

To cooperate with the ratchet teeth 26 there is provided on the frame arm 13 a pivot pin 27 projecting therefrom to serve as a mounting for a pair of pawls 28 and 29. These pawls preferably depend by gravity and normally hang substantially in a vertical direction. The tooth 31 of the pawl 29 is so positioned as to engage immediately with one of the teeth 26 of the ratchet but the tooth 32 of the pawl 28 is spaced from the tooth 31 substantially one-half of the pitch of the teeth 26. While only one of the pawls is effective at any one time, the driving tube 18 can be held accurately at every half-pitch distance throughout the circumference of the ratchet. Conveniently, the depending portions of the pawls 28 and 29 hang down below the lower margin of the frame arm 13 so as to be readily accessible to an operator although the rest of the mechanism is protected by the extending arm 13 itself.

When the driving tube is in assembled location, the ratchet 24 serves as a thrust or end plate. A washer 36 is positioned over the projecting end of the driving tube 18 and is held in location by a cotter pin 37 passing diametrically through the tube 18. Thus the driving tube is mounted for rotation and against endwise displacement.

Designed to run on the driving tube, that is, to be supported by and to be relatively rotatable with respect thereto about the same rotational axis, is a cable tube 38. The cable tube is in journal engagement with the driving tube for much of its length and at one end abuts substantially against the frame arm 12. Intermediate its length, the cable tube enlarges into an integral disc 39 merging with an integral drum 41. The inner periphery of the drum is spaced from and encompasses the driving tube 18, and the drum terminates in an end wall 42 which is in abutting contact with the frame arm 13 and is in journal engagement with the driving tube 18 so that the cable tube is firmly supported at both ends.

Within the drum 41 there are one or more integral, inwardly extending radial abutments 43 and 44 which approach and may contact the driving tube 18. On the driving tube and extending radially outwardly therefrom in the circumferential path of the abutments 43 and 44 are one or more radial plates 45 and 46. These are substantially of the same axial dimension as the interior of the drum. So that the radial extensions 45 and 46 can be assembled with the frame, the journal opening 17 in the frame arm 13 is provided with diametrical extensions 47 and 48 (FIG. 1).

Interposed between each of the radial plates 45 and 46 and its associated radial abutment 43 or 44 is one of a pair of rubber blocks 51 and 52. These are preferably preformed to an arcuate contour to fit snugly within the confines of the drum 41 and lightly to abut the plates 45 and 46 and the abutments 43 and 44 when the mechanism is relaxed.

While for some installations the plates 45 and 46 are short and end between the wall 42 and the disc 39, in most cases the plates 45 and 46 have a sufficient axial extent to project beyond the rubber blocks 51 and 52 into the circumferential path of radial faces 53 and 54 partially bounding openings 56 and 57 in the end wall 42. The circumferential extent of the openings 56 and 57 is such that there is a limited amount only of relative rotation between the driving tube 18 and the cable tube 38 during which the rubber blocks 51 and 52 are deflected or deformed. Any amount of relative rotation in excess of this amount is prevented by direct metal contact between the plate 46 and the face 53 and between the plate 45 and the face 54. Thus, if desired, the amount of deflection of the rubber snubber blocks can be limited.

In some instances this is important but in others it is preferred to shorten the plates 45 and 46 and permit all of the relative rotation between the cable tube 38 and the driving tube 18 to be resisted solely by the interposed rubber blocks 51 and 52. In either case, the openings 56 and 57, like the extensions 47 and 48, afford a passageway for the plates 45 and 46 during assembly. If the cotter pin 37 is lost, the other parts are not easily shaken loose because the plates 45 and 46 are usually out of alignment with the extensions 47 and 48 and so prevent endwise dislodgement.

In order easily to secure a cable, the cable drum 38, as shown particularly in FIGURE 2, is in one locality provided with a radial lug 61 projecting parallel to the disc 39 of the drum 41. A cap screw 62 at the extremity of the lug 61 serves as a pivot for lightly holding a keeper 63 in place. The keeper end is slightly arched to fit the drum and is slightly sprung when engaged with the drum. The keeper tends to stay in retaining position. When the keeper is swung out of the way, there is afforded a channel into which the enlarged end 64 of a cable 66 can be lodged. After the cable end is positioned, the keeper 63 can readily be swung and snapped back into the position shown in FIGURE 2. If desired, the cap screw 62 can be tightened to make sure that the keeper cannot release the cable.

To tighten the cable, a suitable bar is introduced into one of the cross-bores 22 or 23 and the driving tube 18 is thereby rotated in an appropriate direction. The rubber blocks 51 and 52 are deformed and the cable tube 38 is revolved. The cable 66 is thus tightened. The precise tension on the cable can be very carefully regulated and held since the pawls 28 and 29 engage the ratchet at intervals equal to one-half of the ratchet tooth pitch. After the cable has appropriate tension therein and is retained by one of the pawls, any sudden small overload merely causes some further deflection of the rubber blocks. If it is considered that further deflection may at some time become grossly excessive, metallic stops are provided. Otherwise, the resilience of the rubber blocks maintains a cushioned tension on the cable.

What is claimed is:

1. An automotive cable winch comprising a frame, a driving tube journalled near its opposite ends in said frame, a cable tube encompassing said driving tube and journalled thereon between said ends, a drum integral with said cable tube and disposed between said ends in surrounding relationship with said driving tube, an integral disc extending from said cable tube to said drum and forming an end abutment, an end wall extending from said drum toward said driving tube and forming another end abutment, a radial plate extending outwardly from said driving tube and disposed partially within said drum, a radial abutment extending between said disc and said end wall and extending inwardly from said drum into the circumferential path of said radial plate, a rubber block interposed between said disc and said end wall and between said plate and said abutment within said drum and adapted to be deflected upon circumferential movement of said abutment toward said plate, and a radial face on said end wall extending radially inwardly from said drum into the circumferential path of said plate alongside said block and positioned to abut said plate after a predetermined circumferential deflection of said block.

2. An automotive cable winch comprising a frame having a central portion and a pair of arms extending therefrom, means forming aligned journal openings of a predetermined diameter in said arms, said journal opening in one of said arms having a diametrical extension, a driving tube having a uniform portion of a diameter less than said predetermined diameter journalled adjacent its opposite ends in said journal openings in said frame, an axially extending radial plate projecting outwardly beyond said predetermined diameter from said driving tube between said uniform diameter journalled portions thereof, said plate being axially movable through said extension, a cable tube journalled on said uniform portion of said driving tube and being disposed between said plate and the other of said arms, a drum integral with said cable tube and encompassing said plate, radial wall means included in said drum and disposed at both ends thereof at opposite ends of said plate, an axially extending radial abutment projecting inwardly from said drum in the circumferential path of said plate, and a rubber block disposed between said wall means and between said abutment and said plate within said drum.

References Cited in the file of this patent

UNITED STATES PATENTS

| | | |
|---|---|---|
| 708,455 | Blake | Sept. 2, 1902 |
| 1,192,489 | Anglada | July 25, 1916 |
| 2,402,789 | Tweedale | June 25, 1946 |
| 2,895,714 | Clark | July 21, 1959 |